2,816,015

METHOD FOR RECOVERING NICKEL AND COBALT FROM ORES

John W. Donaldson, Hull, Quebec, Canada, assignor to Quebec Metallurgical Industries Ltd., Ottawa, Ontario, Canada, a corporation of Canada No Drawing. Application July 25, 1955, Serial No. 524,295

3 Claims. (Cl. 75—1)

This invention relates to the recovery of nickel and cobalt from laterite ores containing in addition to small amounts of nickel and cobalt, appreciable amounts of chromium, alumina, silica and a substantial amount of Iron. A typical ore of this type contains 47.6% iron, 0.83% nickel, 0.11% cobalt, 2.1% chromium, 6.7% alumina, 0.67% manganese, 0.14% sulphur, 2.8% silica and 0.82% magnesia by weight.

The method of the present invention involves extraction of nickel and cobalt by leaching with sulfur dioxide in the presence of water. In the course of the investigations of such leaching it was discovered that chromium in the ore and in the solution produced an effect which counteracted the leaching effect of sulfur dioxide.

The present invention is based upon the above discovery and also upon the discovery that if the ore is roasted with soda ash under oxidizing conditions and then leached with water, a sufficient proportion of the chromium content can be removed so that the residue may be subjected to a selective reducing roast and then leached with sulfur dioxide in the presence of water to obtain a solution containing substantially all the nickel and cobalt contents of the ore. This method for removal of chromium not only provides a residue from which the nickel and cobalt can be recovered by leaching with sulfur dioxide but it also provides a solution from which chromium, alumina and sodium may be recovered as by-products in a usable or marketable form.

Thus, in accordance with the invention the ore is treated first to remove most of the chromium. After removal of chromium, the ore residue is subjected to a selective reducing roast by heating the residue at an elevated temperature in contact with a reducing gas to reduce the nickel and cobalt compounds in preference to the iron compounds. The roasted material then is leached by quenching the hot calcine in water saturated with sulfur dioxide to obtain a solution containing most of the nickel and cobalt contents of the ore and only a negligible amount of iron. The residue obtained by filtering is a suitable iron ore for treatment in a blast furnace for recovery of the iron. The nickel and cobalt can be recovered separately from the solution by any conventional method.

The preliminary treatment of the ore to remove chromium comprises forming a mixture of the ore in finely divided form with sodium carbonate or sodium bicarbonate and roasting the mixture under oxidizing conditions at a temperature between about 750° and 1000° C. If desired, 10 to 20 percent of water may be added to the mixture and the mixture pelletized before roasting. Preferably, a small amount of lime also is added to the mixture. The amount of lime used should be sufficient to react with the amount of silica in the ore and part of the admixed sodium compound to form a water insoluble silicate. The remaining amount of the sodium compound should be sufficient to convert the chromium and alumina contents of the ore to water soluble sodium chromate and sodium aluminate. The amount of lime used may vary between about 1 and 3 percent and the amount of the sodium compound used may vary between about 7 and 20 percent. The roasted material is leached with water to obtain a solution of the soluble sodium compounds and a solid residue which is subjected to a selective reducing roast followed by leaching with sulfur dioxide as previously described to obtain a solution containing most of the nickel and cobalt contents of the ore and a second residue suitable as an iron ore.

The solution containing the soluble sodium compounds may be treated to recover chromium, alumina and sodium in a usable or marketable form, thus placing the process of the invention upon a very desirable economic basis. Thus, a typical solution having a pH of 11.5 may be gassed with carbon dioxide to precipitate aluminum hydrate and a high grade alumina recovered. After filtering to remove the aluminum hydrate, the filtrate or second solution has a pH of 9.6 and contains sodium chromate and sodium carbonate. This second solution may be evaporated until the pH is about 10.1, then cooled to about 30° C. and gassed with carbon dioxide to precipitate sodium bicarbonate. After filtering to remove the sodium bicarbonate, the filtrate or third solution contains sodium chromate and some sodium as carbonate. This third solution may be evaporated to about one-half its volume with evolution of carbon dioxide and then cooled to crystallize out relatively pure sodium chromate. As an alternative method for recovering chromium, the above mentioned third solution may be diluted to twice its volume and then sulfur dioxide may be introduced until the pH of the solution is not less than 6.4 to precipitate a chromium compound containing about 56.8 percent chromium and about 6.7 percent sulfur, the remaining solution containing sodium sulfate.

The invention is illustrated further by the following example. 1000 grams of an ore containing 47.6% iron, 0.81% nickel, 0.11% cobalt, 2.1% chromium, 2.8% silica and 6.7% alumina was crushed to minus 28 mesh Tyler and well mixed with 15 percent of sodium carbonate and 2.6 percent of burnt lime by weight based upon the ore. This mixture was roasted in an oxidizing atmosphere for two hours at about 1000 ° C. and was then quenched in water. The solids or tailing, separated from the solution by filtering, weighed 840 grams and contained 55.4% iron, 1.03% nickel, 0.15% cobalt, 0.47% chromium, 4.2% alumina and 2.6% silica. The volume of the solution was 2000 cc. and had a pH of 11.5. The solution contained 0.012 grams silica, 15 grams alumina and 8.5 grams chromium per liter, representing a removal of 81 percent of the chromium and 45 percent of the alumina from the ore and a negligible amount of silica.

The tailing in finely divided form was subjected to a selective reducing roast by heating to a temperature of 700° C. to 950° C. for 2 to 4 hours in contact with a mixture of carbon monoxide, carbon dioxide, hydrogen and water vapor in air. The hot calcine was quenched in a saturated sulfur dioxide water solution at a pH of about 1.2. The solution obtained after removal of solids had a volume of 2,000 cc. and contained 3.9 grams per liter of nickel, 0.4 grams per liter of cobalt and 6.2 grams per liter of iron, representing a recovery of 90 percent of the cobalt and 90 percent of the nickel contents of the ore and the residue assayed less than 0.10 percent cobalt plus nickel.

I claim:

1. In a method for recovering nickel and cobalt from a laterite ore containing small amounts of nickel and cobalt and which includes an appreciable amount of chromium and a substantial amount of iron and wherein water saturated with sulfur dioxide is used to extract the nickel and cobalt, the steps which comprise treating the ore to remove most of its chromium content while retaining most of its contents of nickel, cobalt and iron, thereafter subjecting the residue obtained by such treatment to a selective reducing roast by heating in contact with a reducing gas to reduce its nickel and cobalt compounds in preference to its iron compounds, and subjecting the reduced residue to leaching with water saturated with sulfur dioxide to obtain a solution containing most of the nickel and cobalt contents of the ore.

2. The method claimed by claim 1 wherein chromium removal is effected by mixing the ore in finely divided form with a compound selected from the group consisting of sodium carbonate and sodium bicarbonate, the amount of said compound being sufficient to convert the chromium content of the ore to water soluble sodium chromate, roasting the mixture under oxidizing conditions at a temperature between about 750° C. and 1000° C., and leaching the roasted mixture with water to remove the water soluble sodium chromate.

3. The method claimed by claim 1 wherein chromium removal is effected by mixing the ore in finely divided form with lime and a compound selected from the group consisting of sodium carbonate and sodium bicarbonate, the amount of lime being sufficient to react with the amount of silica in the ore and part of said compound to form a water insoluble silicate, the remaining amount of said compound being sufficient to convert the chromium content of the ore to water soluble sodium chromate, roasting the mixture under oxidizing conditions at a temperature between about 750° C. and 1000° C., and leaching the roasted mixture with water to remove the water soluble sodium chromate.

References Cited in the file of this patent

UNITED STATES PATENTS

| | | |
|---|---|---|
| 1,575,852 | McCormack | Mar. 9, 1926 |
| 2,187,750 | Marvin | Jan. 23, 1940 |
| 2,349,223 | Hedley et al. | May 16, 1944 |
| 2,381,565 | Udy | Aug. 7, 1945 |